United States Patent
DeKeuster et al.

(10) Patent No.: US 12,525,672 B2
(45) Date of Patent: Jan. 13, 2026

(54) BATTERY MODULE AND BUS BAR HAVING STRESS-RELIEVING FEATURES

(71) Applicant: CPS Technology Holdings LLC, New York, NY (US)

(72) Inventors: Richard M. DeKeuster, Racine, WI (US); Ken Nakayama, Racine, WI (US); Xugang Zhang, Shorewood, WI (US)

(73) Assignee: CPS Technology Holdings LLC, New York, NY (US)

( * ) Notice: Subject to any disclaimer, the term of this patent is extended or adjusted under 35 U.S.C. 154(b) by 1031 days.

(21) Appl. No.: 17/605,542

(22) PCT Filed: Apr. 22, 2020

(86) PCT No.: PCT/US2020/029301
§ 371 (c)(1),
(2) Date: Oct. 21, 2021

(87) PCT Pub. No.: WO2020/219533
PCT Pub. Date: Oct. 29, 2020

(65) Prior Publication Data
US 2022/0271394 A1   Aug. 25, 2022

Related U.S. Application Data

(60) Provisional application No. 62/837,028, filed on Apr. 22, 2019.

(51) Int. Cl.
*H01M 50/209*   (2021.01)
*H01M 50/503*   (2021.01)
*H01M 50/507*   (2021.01)

(52) U.S. Cl.
CPC ....... *H01M 50/209* (2021.01); *H01M 50/503* (2021.01); *H01M 50/507* (2021.01)

(58) Field of Classification Search
CPC . H01M 50/209; H01M 50/507; H01M 50/503
See application file for complete search history.

(56) References Cited

U.S. PATENT DOCUMENTS

| | | |
|---|---|---|
| 2012/0121966 A1 | 5/2012 | Kim |
| 2014/0017538 A1 | 1/2014 | Nakamori |

(Continued)

FOREIGN PATENT DOCUMENTS

| | | |
|---|---|---|
| CN | 102171858 A | 8/2011 |
| CN | 103545467 A | 1/2014 |

(Continued)

OTHER PUBLICATIONS

International Search Report and the Written Opinion of the International Searching Authority, dated Jul. 2, 2020 for PCT/US2020/029301, 158 pages.

*Primary Examiner* — Nathanael T Zemui
(74) *Attorney, Agent, or Firm* — Boardman & Clark LLP

(57) ABSTRACT

Accordingly, a bus bar for a battery module is disclosed. The bus bar has a first sidewall, a second sidewall and a base joined to form a channel. A plurality of terminal receivers are provided on the base and configured to couple to a plurality of battery terminals. One or more stress-relief features are provided on the channel. A battery module including a bus bar is also disclosed.

15 Claims, 8 Drawing Sheets

(56) References Cited

U.S. PATENT DOCUMENTS

2015/0171401 A1    6/2015  Kim
2020/0106075 A1*  4/2020  Yanagida ............ H01M 50/505
2022/0328896 A1* 10/2022  Kim .................... H01M 10/613

FOREIGN PATENT DOCUMENTS

| CN | 104412417 A | 3/2015 |
| CN | 104716378 A | 6/2015 |
| CN | 205508837 U | 8/2016 |
| CN | 106058128 A | 10/2016 |
| CN | 205629337 U | 10/2016 |
| CN | 107534121 A | 1/2018 |
| WO | 2018/139350 A1 | 8/2018 |
| WO | 2020/219533 | 10/2020 |

* cited by examiner

BATTERY MODULE AND BUS BAR HAVING STRESS-RELIEVING FEATURES

CROSS-REFERENCE TO RELATED APPLICATIONS

This is a 371 national phase entry of International Application No. PCT/US2020/029301, filed Apr. 22, 2022, which claims priority to United States Provisional Patent Application, Ser. No. 62/837,028 filed Apr. 22, 2019, entitled "STRESS RELIEF CUTS FOR COLUMN BUS BARS", the entire content of which is hereby incorporated by reference in its entirety herein.

BACKGROUND

The present disclosure generally relates to the field of batteries and battery modules. More specifically, this disclosure relates to cell connections within advanced batteries, such as lithium ion batteries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system. The term HEV may include any variation of a hybrid electric vehicle. For example, fill hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Further, a micro-hybrid electric vehicle (mHEV) also uses a "Stop-Start" system similar to the mild hybrids, but the micro-hybrid systems of a mHEV may or may not supply power assist to the internal combustion engine. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

In addition to use in vehicles (e.g., vehicles, boats, trucks, motorcycles, and airplanes), advances in battery technology and rechargeable batteries are more frequently being used in what may be referred to as stationary battery applications. Applications for stationary batteries, which are often used in backup or supplemental power generation, are becoming more widespread with improvements in rechargeable aspects of batteries and with the lowering of prices for such technology. For example, stationary batteries may be utilized for industrial and/or household applications. Such applications may include DC power plants, substations, back-up power generators, transmission distribution, solar power collection, and grid supply.

The present disclosure relates to batteries and battery modules. As a non-limiting specific example, the present disclosure may relate to Lithium ion batteries (Li-ion batteries or LiBs), which are commonly used rechargeable batteries that generally include a plurality of battery cells arranged within a housing. Energy is produced through an electrochemical reaction in each battery cell between a negative electrode (anode), a positive electrode (cathode), and an electrolyte that carries ions between the anode and cathode.

Battery cells may comprise a positive and a negative terminal. A bus bar may be used to connect, for example, the positive terminal of one battery cell to the negative terminal of another battery cell. Similarly, bus bars may be used to connect groups of cells (cell stacks) together, from negative terminal to positive terminal, for example. As a result of facilitating these connections, the bus bars may be subject to stress, such as heat and electrical loads. In addition, longer bus bars may be subject to mechanical load stress due to the relative movement of the battery housing, battery cells, plates, stacks, etc. and other connected elements, as well as thermal expansion of the bus bar due to heat. These factors may result in damage or breakage to the bus bars, which may adversely impact battery performance.

Attempts have been made to try and overcome some of these deficiencies by producing bus bars having some flexibility. Unfortunately, to date these flexible bus bar solutions are insufficient. For example, known bus bars having flexibility have disadvantages in one or more of conductivity, manufacturability, design complexity and/or cost.

Thus, a need exists for a bus bar and battery module having same which overcomes or solves one or more of the deficiencies of prior and existing devices.

SUMMARY

Accordingly, a bus bar and a battery or battery module which address one or more of the described deficiencies are disclosed. In one or more examples of embodiments described herein, a stress-relief feature or more than one stress-relief feature is provided on a bus bar which connects battery cells in adjacent battery cell stacks. The bus bar may advantageously provide or be provided with a degree of flexibility. The flexibility may allow for movement of the bus bar and management of thermal challenges described above.

Therefore, a bus bar for a battery module is disclosed. The bus bar has a first sidewall, a second sidewall and a base joined to form a channel. A plurality of terminal receivers are provided on the base and configured to couple to a plurality of battery terminals. One or more stress-relief features are provided on the channel.

A battery module is also disclosed. The battery module comprises a battery housing having a battery cell compartment which receives one or more battery cells in battery cell stacks. A plurality of battery cells are joined together and form a plurality of battery cell stacks. A bus bar carrier is positioned over the plurality of battery cells and plurality of battery cell stacks. The bus bar carrier has one or more bus bars thereon electrically coupling the plurality of battery cells, wherein the one or more bus bars comprise one or more bus bars having stress relief features. A cover is provided, enclosing the bus bar carried and plurality of battery cells and secured to the housing.

These and other features and advantages of devices, systems, and methods are described in, or are apparent from, the following detailed descriptions and drawings of various examples of embodiments.

BRIEF DESCRIPTION OF DRAWINGS

Various examples of embodiments of the systems, devices, and methods will be described in detail, with reference to the following figures, wherein.

Figure 1:
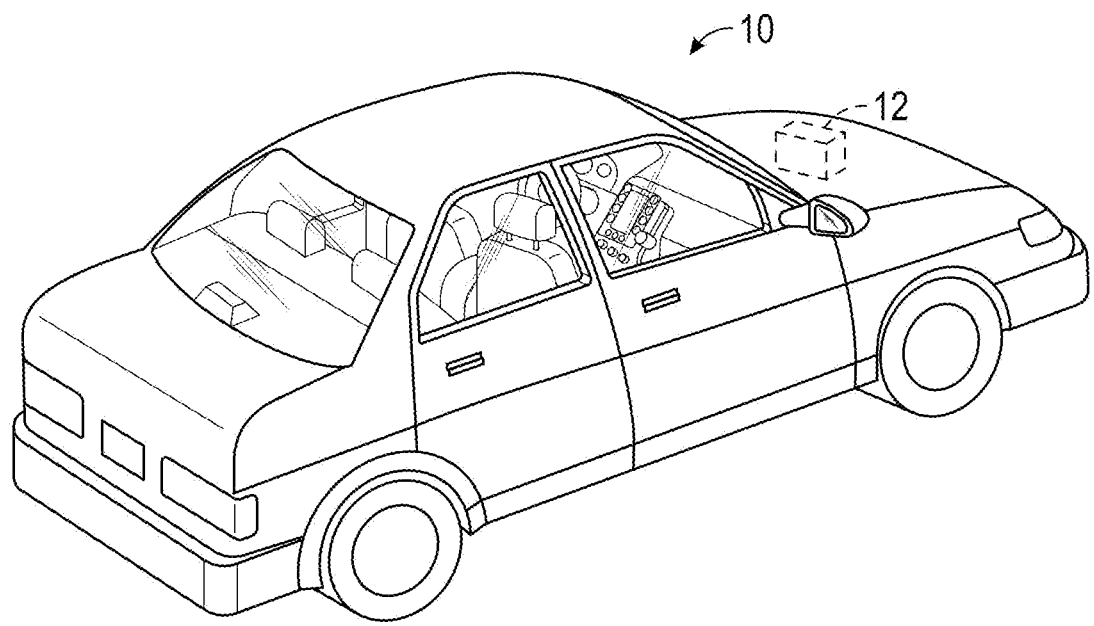
FIG. 1 is a perspective view of a vehicle having a battery module according to one or more examples of embodiments described herein.

It should be understood that the drawings are not necessarily to scale. In certain instances, details that are not necessary to the understanding of the disclosure or render other details difficult to perceive may have been omitted. For ease of understanding and simplicity, common numbering of elements within the numerous illustrations is utilized when the element is the same in different Figures. It should be understood, of course, that the invention is not necessarily limited to the particular embodiments illustrated herein.

DETAILED DESCRIPTION

Before describing in detail one or more examples of embodiments, it is noted that the embodiments reside primarily in combinations of apparatus components and processing steps related to cells of a battery module within a housing. Accordingly, the system and method components have been represented where appropriate by conventional symbols in the drawings, and/or showing only those specific details that are pertinent to understanding the embodiments of the present disclosure so as not to obscure the disclosure with details that will be readily apparent to those of ordinary skill in the art having the benefit of the description herein.

Referring to the Figures, a battery module, battery system, and bus bar(s) for use with same are disclosed. The battery module, battery systems, and associated devices described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of a xEV. As another example, battery modules in accordance with present embodiments may be incorporated with or provide power to stationary power systems (e.g., non-automotive systems).

Based on the advantages over traditional gas-powered vehicles, manufactures, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. In accordance with aspects of the present disclosure, since traditional gas-powered vehicles are designed to utilize 12 volt battery systems, a 12 volt or 48 volt lithium ion battery may be used to supplement a 12 volt lead-acid battery. More specifically, the 12 volt or 48 volt lithium ion battery may be used to more efficiently capture electrical energy generated during regenerative braking and subsequently supply electrical energy to power the vehicle's electrical system.

As advancements occur with vehicle technologies, high voltage electrical devices may also be included in the vehicle's electrical system. For example, the lithium ion battery may supply electrical energy to an electric motor in a mild-hybrid vehicle. Often, these high voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

To help illustrate, FIG. 1 is a perspective view of an embodiment of a vehicle 10. As discussed above, it would be desirable for a battery system 12 to be largely compatible with traditional vehicle designs. Accordingly, the battery system 12 may be placed in a location in the vehicle 10 that, may house a traditional battery system. For example, as illustrated, the vehicle 10 may include the battery system 12 in positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12. While specific examples of locations are described, one of skill in the art will appreciate that variations thereon would also be acceptable for the purposes provided.

Figure 2:
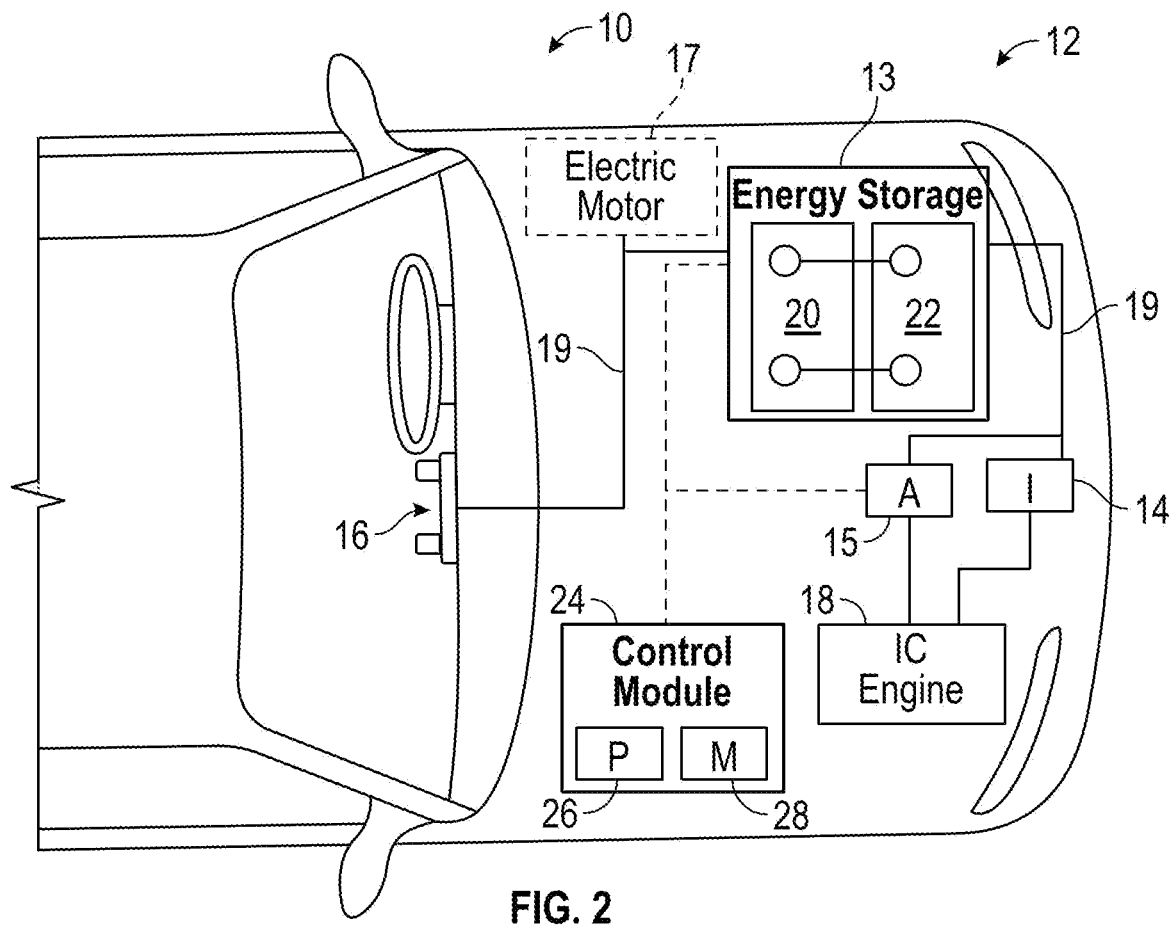
FIG. 2 is a schematic view of a battery system for use with a vehicle according to one or more examples of embodiments described herein.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells 110. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives.

In some embodiments, the control unit 24 may include portions of a vehicle control unit (VCU) and/or a separate battery control module.

In accordance with the present disclosure, the housing 100 of the battery module 20 includes one or more covers or lids 102, 104 configured to seal or cover the housing 100. For example, referring to FIGS. 5-6, the housing 100 may include a first cover 102 that fits over a first side 106 of the housing 100, where the first side 106 of the housing 100 retains, for example, a printed circuit board (PCB) and other electrical components (not shown) of the battery module 20. A second cover 104 may be disposed over the second side 108 of the housing 100 to seal or cover the second side 108 of the housing 100, which may include, for example the battery cells 110 and associated electrical connection assembly or apparatus. The first or second cover 102 or 104 of the housing 100 may include various features, such as but not limited to, a handle for transport and/or a vent path which allows the scape of gases or fluids, and the like (not shown).

Figure 3:
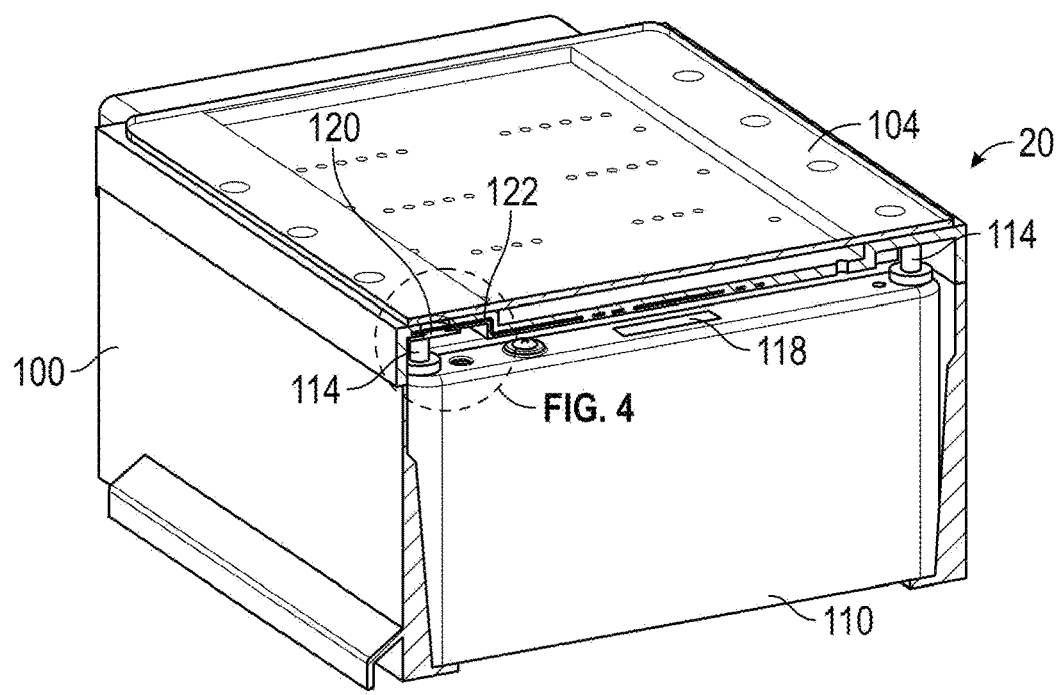
FIG. 3 is a cutaway partial view of a battery module according to one or more examples of embodiments disclosed herein.

In accordance with embodiments of the present disclosure, the battery module 20 may include a housing 100 (e.g., plastic housing) configured to retain electrochemical cells 110 (e.g., prismatic lithium-ion [Li-ion] electrochemical cells) within an inside of the housing 100 (see FIG. 3). The housing 100 illustrated and described herein may contain multiple stacks of prismatic lithium-ion (Li-ion) electrochemical cells 110. While a specific configuration will be described in greater detail herein, it is contemplated that the battery module 20 may include any number of electrochemical cells 110 (e.g., 2, 3, 4, 5, 6, 7, 8, 9, 10, or more electrochemical cells), any type of electrochemical cell (e.g., Li-ion, lithium polymer, lead-acid, nickel cadmium, or nickel metal hydride, prismatic, and/or cylindrical), and any arrangement of the electrochemical cells 110 (e.g., stacked, separated, or compartmentalized).

The battery elements or electrochemical cells 110 may be provided atop a heat sink (not shown). The electrochemical cells 110 may include terminals 114 (see FIGS. 3-4). The electrochemical cells 110 may be inserted into the housing 100 through the openings 116 or battery cell compartment(s) in the second side 108 of the housing 100, and positioned within the housing 100 such that the terminals 114 of the electrochemical cells 110 are disposed or accessible in the opening or battery cell compartment (see FIG. 5). The electrochemical cells 110 may also include vents 118 configured to enable gases from within the electrochemical cells 110 to vent into the inside of the housing 100 in certain operating conditions (e.g., if a pressure within one or more individual electrochemical cell exceeds a cell venting pressure threshold of the corresponding one or more individual electrochemical cells).

Figure 4:
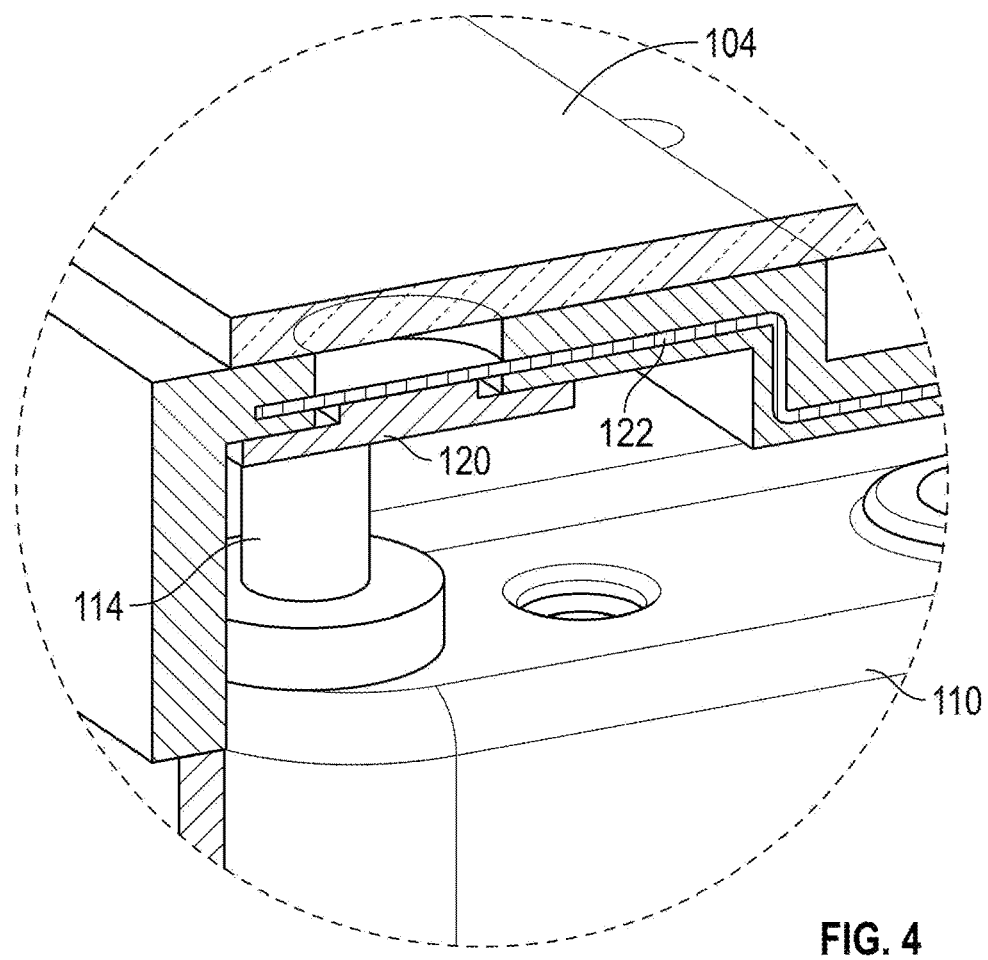
FIG. 4 is a detail view of portions of the battery module shown in FIG. 3.

Referring to FIGS. 3-4, a cut-away partial view of an example battery module 20 is shown having a bus bar 120 according to one or more examples of embodiments described herein. In FIG. 3, a cell 110 or element having terminals 114 is visible, as well as a cross-section of a bus bar carrier 122. The bus bar 120, shown in cross-section, is provided generally between the terminal 114 and the lid or cover 104 of the housing and/or bus bar carrier 122. This can be more clearly seen in FIG. 3. The bus bar 120 is seated on and electrically coupled to the cell terminal 114.

One or more examples of a battery module 20 are shown in FIGS. 5-8. The battery module 20 illustrated includes a battery assembly comprising six battery cells 110 divided into two cell stacks 124 provided adjacent to each other. While six battery cells 110 and two cell stacks 124 are provided, as previously described herein it should be understood that variations in the number of battery cells 110 (2, 4, 8, etc.) and number of cell stacks 124 (3, 4, etc.) may be suitable for the purposes provided. As a non-limiting example, a battery assembly or module 20 could comprise nine battery cells 110 divided between three cell stacks 124 provided adjacent to one another. The total voltage of the battery module 20 may be varied, for example, based on the number of battery cells 110, in order to output a desired voltage, such as 8 volts, 12 volts, 24 volts, 48 volts, etc.

In FIGS. 5-8, one or more examples of embodiments of a battery or battery module having cell stacks 124 and an electrical conduction assembly having cell-connecting bus bars 126, housing-connecting bus bars 128, and stack-connecting bus bars 120 are shown. More specifically, the bus bar carrier 122 has an electrical conduction assembly configured to be in electrical communication with each of the plurality of cells 110 located within the cell compartment 116 or cavity of the housing 100. Two cell stacks 124 can be seen provided within the housing 100 in an adjacent arrangement and a bus bar carrier 122 having the electrical conduction assembly may be provided atop the cell stacks 124, connecting the cells 110 by way of the cell-connecting bus bars 126, housing-connecting bus bars 128, and stack-connecting bus bar(s) 120. The bus bar carrier 122 and electrical conduction assembly is disposed into the opening 116 of the housing 100. The bus bar carrier 122, therefore, may have bus bars 120, 126, and/or 128 disposed thereon, where the bus bars are configured to interface with the terminals 114 of the electrochemical cells 110. The bus bars 120, 126, and/or 128 may interface with the terminals 114 to electrically couple adjacent electrochemical cells 110 together and/or adjacent cell stacks 124. Depending on the embodiment, the bus bars may couple the electrochemical cells 110 in series, in parallel, or some of the electrochemical cells 110 in series and some of the electrochemical cells 110 in parallel. Further, certain of the bus bars may be configured to electrically couple the electrically interconnected group of electrochemical cells 110 with major terminals of the battery module 20, where the major terminals are configured to be coupled to a load (e.g., component(s) of the vehicle 10) to power the load.

Figure 5:
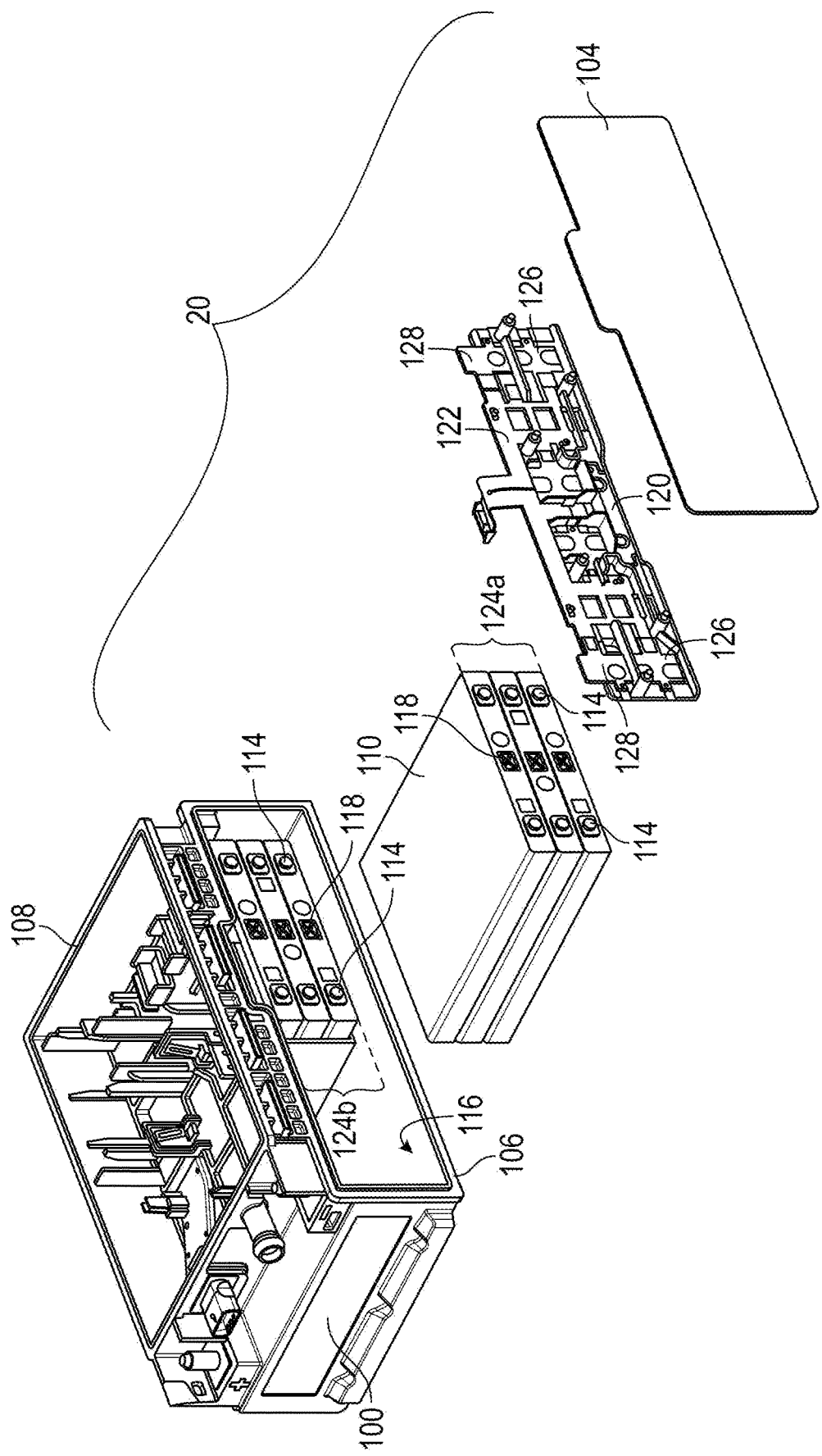
FIG. 5 is an exploded perspective view of a battery module for use with the bus bar disclosed herein according to one or more examples of embodiments.
Figure 6:
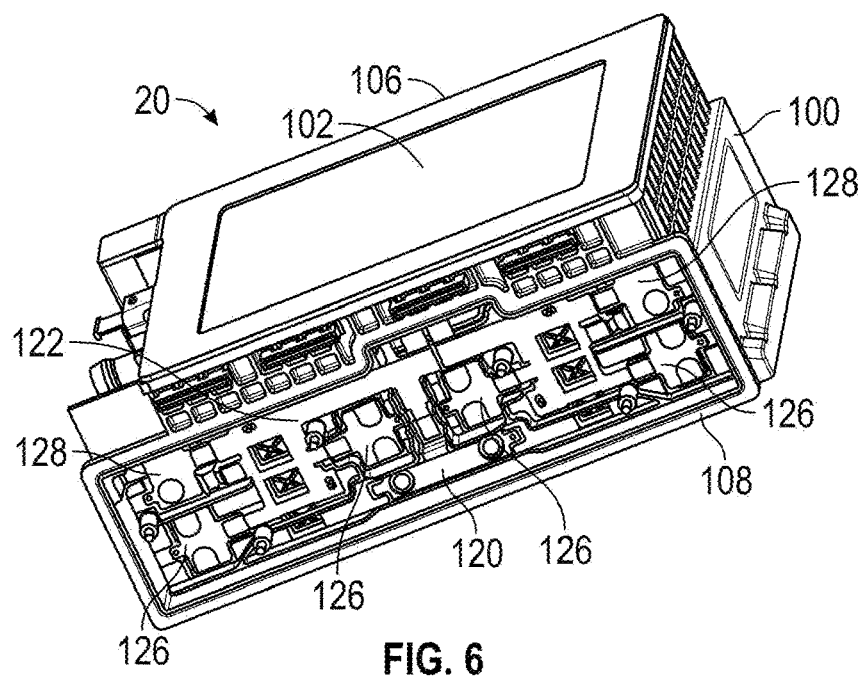
FIG. 6 is a perspective view of the battery module of FIG. 5, absent the lid or cover over the battery cell compartment, showing a number of bus bars provided on a battery cell assembly according to one or more examples of embodiments, with terminal connections to bus bars illustrated for positional reference.
Figure 7:
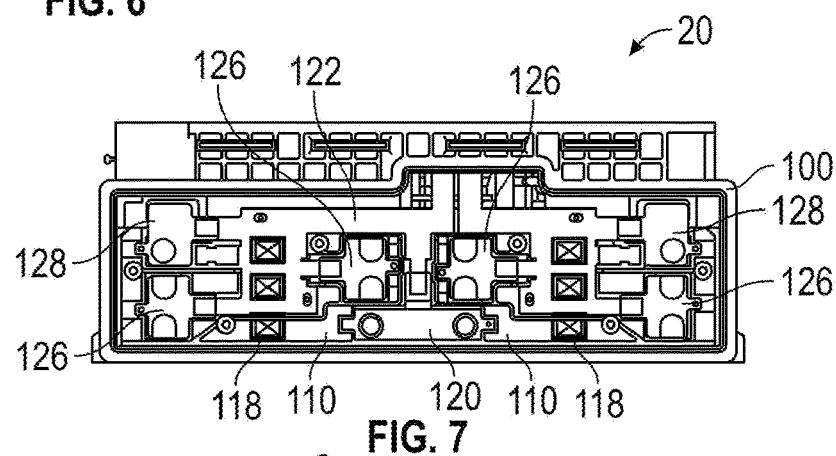
FIG. 7 is a front elevation view of the battery module shown in FIG. 6.
Figure 8:
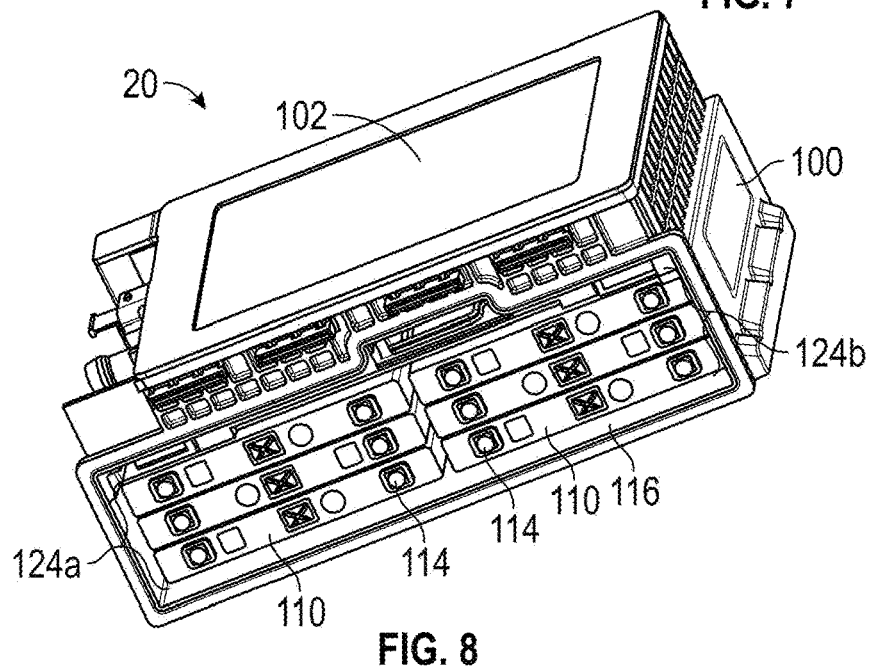
FIG. 8 is a perspective view of the battery module shown in FIG. 6, with the bus bar carrier and bus bars removed to show the battery cells.

A lid or lid panel or cover 104 of the housing is configured to cover the bus bar carrier 122 and electrical conduction assembly (see FIG. 5). The electrical conduction assembly may be coupled to the cover 104, or provided within the cover, or may additionally or alternatively be located at other locations within the housing provided that at least a portion of the electrical conduction assembly is in contact with each cell 110 from the plurality of cells.

As indicated, a variety of bus bars may be used with the battery module 20 described herein alone or in combination, including but not limited to, one or more cell-connecting bus bars 126, one or more housing-connecting bus bars 128, and/or one or more stack-connecting bus bars 120. In this regard, and referring to FIGS. 5-7, the described bus bars may be understood to connect terminals 114 of the battery cells 110 and/or may connect cell stacks 124, and/or may connect the battery cells 110 to the housing 100. Thus, the cell-connecting bus bars 126 may connect battery cells 110, the stack-connecting bus bars 120 may connect battery cell stacks 124, and, the housing-connecting bus bars 128 may connect the battery cells 110 to the housing 100.

Figure 9:
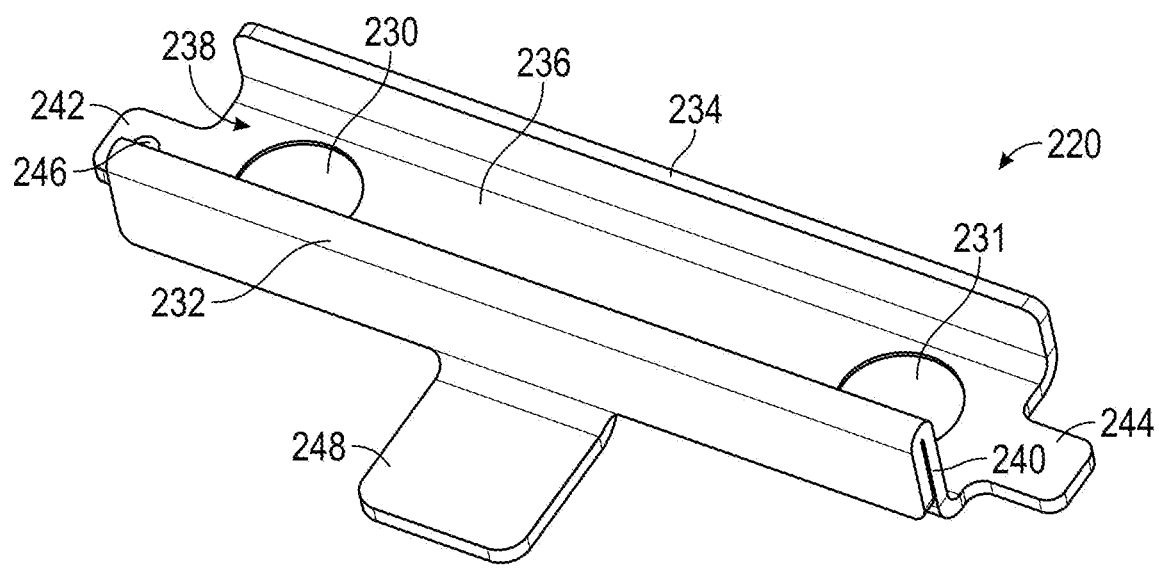
FIG. 9 is a perspective view of a first side of a known bus bar provided for purposes of illustration.
Figure 10:
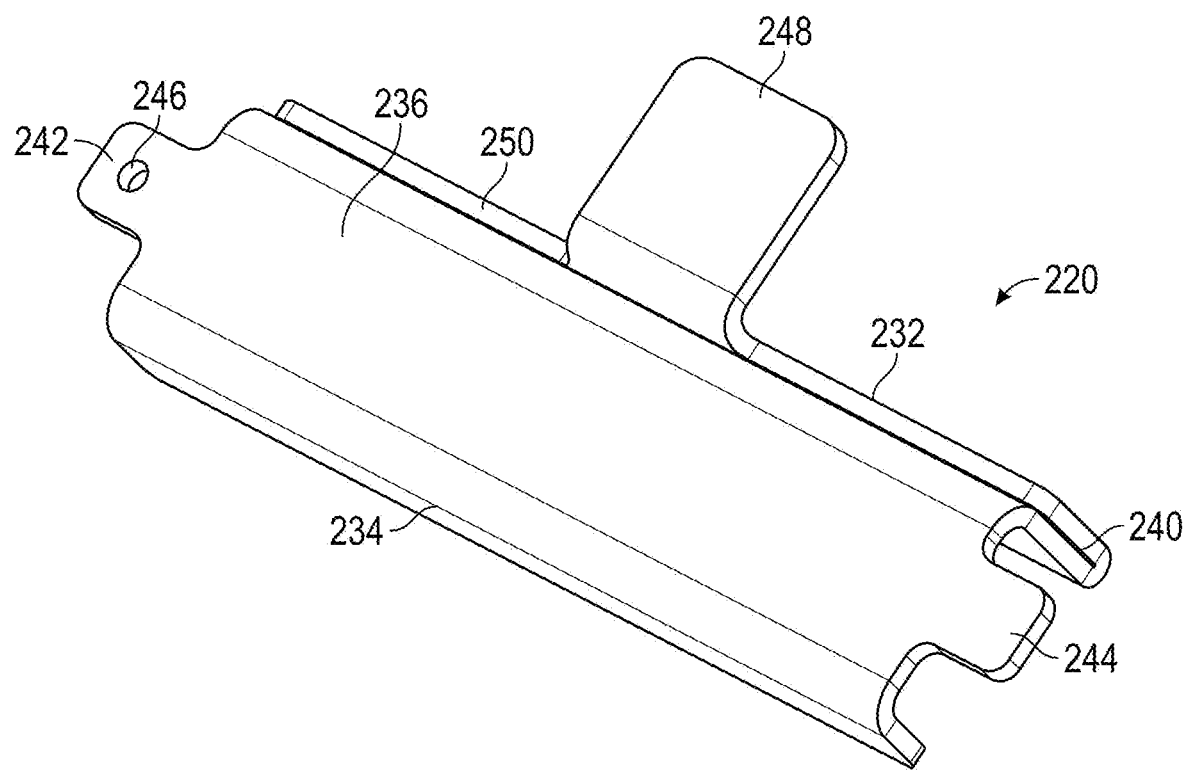
FIG. 10 is a perspective view of a second side of the known bus bar shown in FIG. 9, provided for purposes of illustration.

Referring to FIGS. 9-10, existing or known stack-connecting bus bars 220 are shown for purposes of illustration and example. In particular, a bottom view and a top view of a known stack-connecting bus bar 220 are shown. As illustrated, the bus bar 220 may have a continuous, elongated U-shaped body with terminal receivers 230, 231. More specifically, the U-shaped body of the stack-connecting bus bar 220 is composed of a first sidewall 232 spaced from a second sidewall 234 by an integrally connected base 236 which is oriented approximately perpendicular to the first sidewall and second sidewall, collectively defining a channel 238 and forming the U-shaped body. The first sidewall 234 has a folded configuration, such that the first sidewall forms a dual wall 240. The folded configuration or dual wall 240 provides strength and rigidity to the stack-connecting bus bar 220. The base 236 has a first terminal receiver 230 and a second terminal receiver 231. The terminal receivers 230, 231 are generally recessed areas in the surface of the base 236 of the channel 238. In the illustrated example, the first receiver 230 and the second receiver 231 have a shape which mates with the cross-section or top surface of the terminal 114 (see FIG. 4). In this regard, the first receiver 230 and second receiver 231 are generally circular in shape. The stack-connecting bus bar 220 may also comprise a first end projection 242 and a second end projection 244 which extend from the base 236. One of the end projections may also include an aperture 246 therein. A center projection 248 may also be provided, extending generally laterally or perpendicularly from the top portion 250 or folded segment of the stack-connecting bus bar 220. In the illustrated example, the center projection 248 extends from the dual wall sidewall 140. The projections 242, 244 and/or 248 may couple to the bus bar carrier 122.

As described herein, stack-connecting bus bars 220, 120 may be subject to certain stressors or forces. In examples of battery modules 20 described herein, individual battery cells 110 may be joined into cell stacks 124 by adhesive or other attachment. As a result, when multiple cell stacks 124 are coupled together by a stack-connecting bus bar, each cell stack 124 has a higher mass (for example, three battery cells versus one battery cell) and consequently may be subject to higher mass loading during movement of the battery module 20. Further, when the cell stacks 124 are provided in a side-by-side or adjacent configuration such as shown in the Figures, there is a greater chance of the stacks 124a, 124b moving independently, placing stress on the bus bar and weld joints or connections attaching the bus bar to the terminals. In addition to the foregoing, when the battery module 20 includes prismatic battery cells 110, such as those illustrated in the Figures herein, there may be increased distance between the cells 110. This increased distance requires a longer bus bar. The increased distance may also subject the battery cells 110 to shorts due to the longer bus bar. The longer bus bars may also be subject to thermal expansion, placing stress on the connection to the terminals and battery cells. Accordingly, known stack-connecting bus bars can cause damage to the weld joint at the terminal 114 to bus bar connection and/or damage the terminal 114 at the weld joint (see FIGS. 3-4). Deformation of the battery cell 110 can also occur due to the increased stress or load placed thereon as a result of the stack-connecting bus bar. In some examples of embodiments, generally longer bus bars may experience increased stressors as compared to shorter bus bars, although all bus bars may experience similar stresses and benefit from the features described herein.

Figure 11:
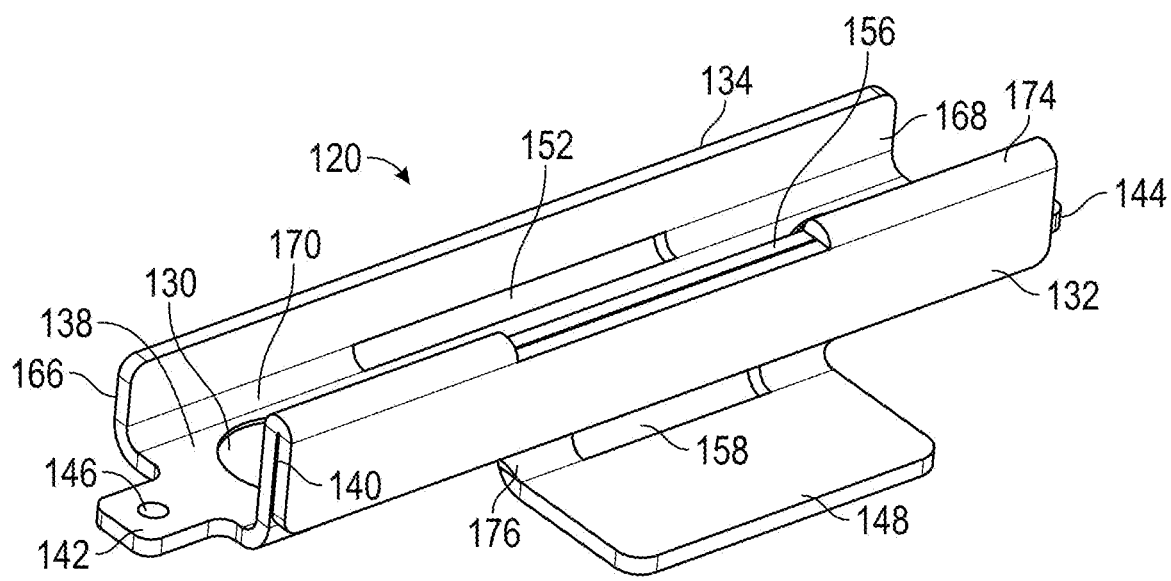
FIG. 11 is a first perspective view of a first side of a bus bar having stress-relief features according to one or more examples of embodiments.
Figure 12:
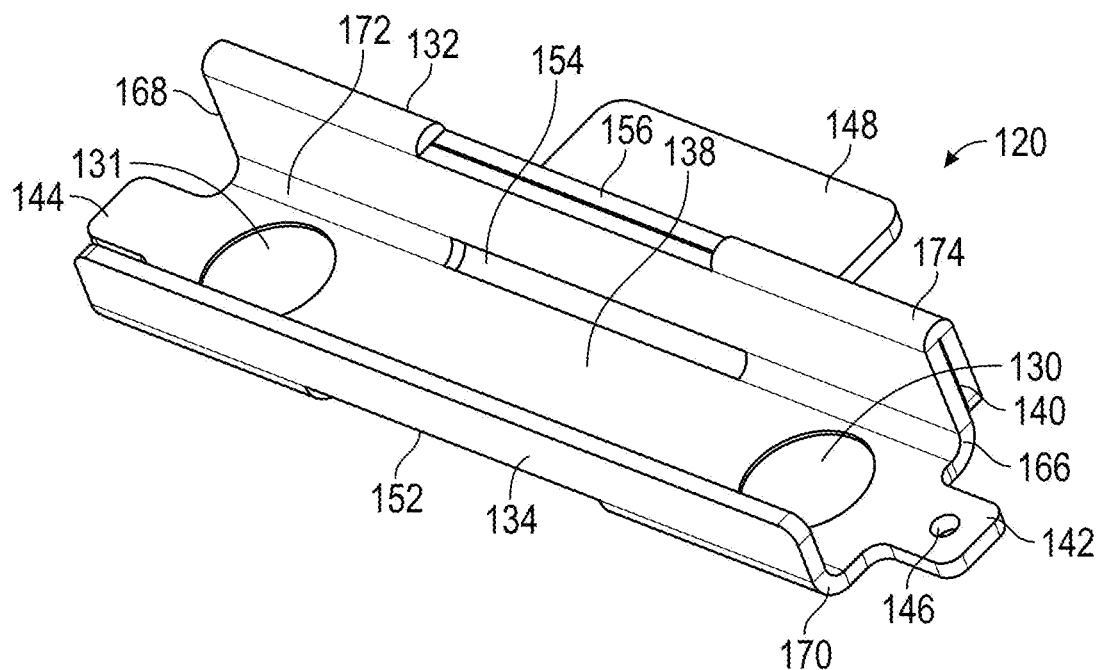
FIG. 12 is a second perspective view of the first side of a bus bar shown in FIG. 11, according to one or more examples of embodiments.
Figure 13:
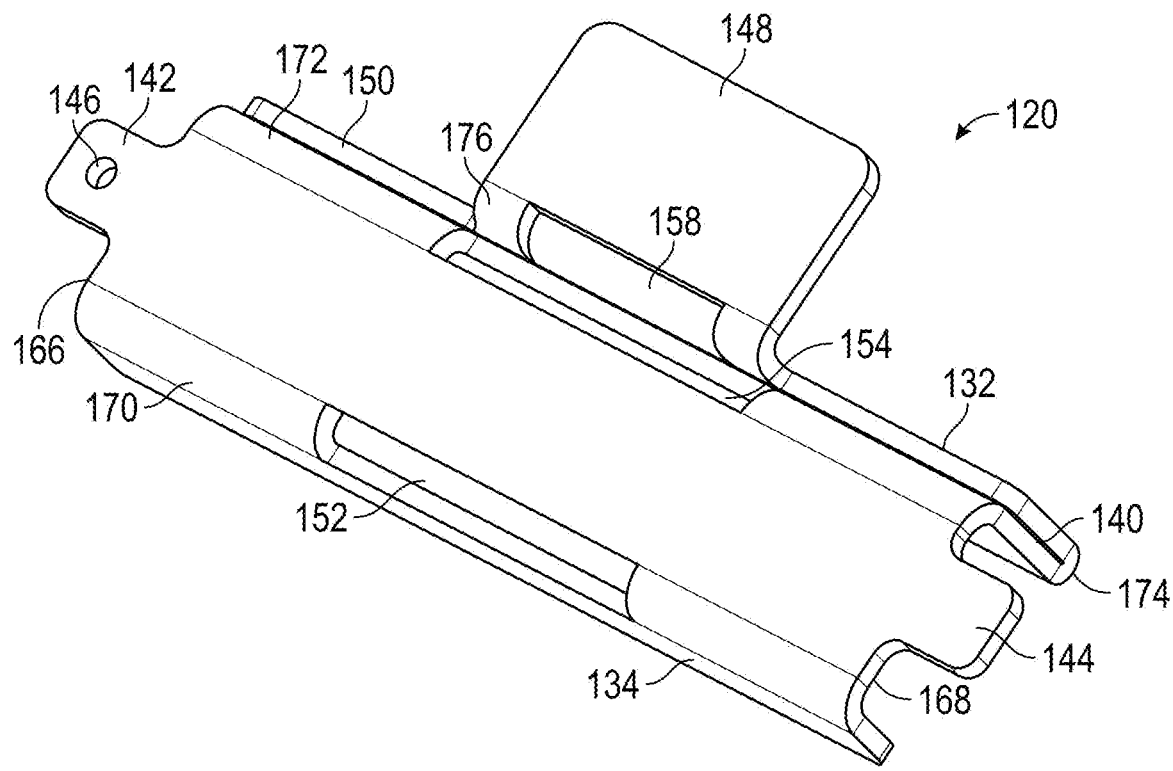
FIG. 13 is a perspective view of a second side of the bus bar shown in FIG. 11, according to one or more examples of embodiments.

Referring to FIGS. 11-13, one or more examples of an improved bus bar 120 described herein for use with the battery module 20 are shown. The bus bar 120 may be comprised of a conductive material. For example, the bus bar may be comprised of aluminum. While aluminum is provided, aluminum alloys, alternative materials and alloys thereof should be contemplated as within the scope of this disclosure.

As will be discussed in greater detail herein below, the bus bar may be a stack-connecting bus bar 120 having one or more stress relief features. However, similar features may be provided on the cell-connecting bus bar 126 and housing-connecting bus bar to achieve similar benefits. Similar to the bus bar 220 described in reference to FIGS. 9-10, the stack-connecting bus bar 120 may be comprised generally of a U-shaped body. That is, the U-shaped body of the stack-connecting bus bar 120 is composed of a first sidewall 132 spaced from a second sidewall 134 by an integrally connected base 136 which is oriented approximately perpendicular to the first sidewall and second sidewall, collectively defining a channel 138 and forming the U-shaped body. The first sidewall 132 has a folded configuration, such that the first sidewall font's a dual wall 140. The folded configuration or dual wall 140 provides strength and rigidity to the stack-connecting bus bar 120. The base 136 has a first terminal receiver 130 and a second terminal receiver 131. The terminal receivers 130, 131 are generally recessed areas in the surface of the base 136. In the illustrated example, the first receiver 130 and the second receiver 131 have a shape which mates with the cross-section or top surface of the terminal 114 (see FIG. 4). In this regard, the first receiver 130 and second receiver 131 are generally circular in shape, although variations thereon may be acceptable. The stack-connecting bus bar 120 may also comprise a first end projection 142 and a second end projection 144 which extend from the base 136. One of the end projections may also include an aperture 146 therein. A center projection 148 may also be provided, extending generally laterally or perpendicularly from the top portion 150 or end portion of the dual wall 140 of the stack-connecting bus bar 120. The center projection 148 may be configured to extend from either side of the bus bar 120 to allow for alternative orientations of the bus bar in the battery module. The projections 142, 144, and/or 148 may couple to the bus bar carrier 122.

The bus bar 120 (and/or bus bars 126, 128) may further comprise a number of stress-relief features. The stress-relief features may comprise, in various embodiments, one or more cutouts or apertures 152 in the bus bar 120. In the illustrated examples, the apertures 152 are provided approximately centered between the first end 166 and second end 168 of the stack-connecting bus bar 120, although variations thereon may be acceptable. Referring to FIG. 11, a cutout or aperture 152 is shown between the second sidewall 134 and the base 136, for example, at a joint or elbow or bend 170 connecting the second sidewall 134 and the base 136. The cutout or aperture 152 in this illustrated examples may be approximately one third to one half of the length of the bus bar 120, although variation thereon may be acceptable. The aperture 152 height may comprise an entire width of the joint 170, though shorter or taller cutouts should be contemplated as within the scope of this disclosure. A second aperture 154 or cutout may likewise be provided between the first sidewall 132 and base 136, for example, at the joint or elbow 172 between the first sidewall 132 and base 136, an example of which is visible in FIG. 12. Similarly, this cutout or aperture 154 may be approximately one third to one half of the length of the bus bar 120. The aperture 154 height may likewise comprise an entire width of the joint 172, though shorter or taller cutouts or apertures should be contemplated as within the scope of this disclosure. A cutout or aperture or recess 156 is also provided at the top of the first sidewall 132 in FIGS. 11-12, at the fold or bend 174 in the dual wall sidewall 140. The cutout or aperture 156 may similarly extend approximately one third to one half of the length of the bus bar 120, although variations thereon are contemplated. The width may correspond to the thickness of the dual wall 140. These cutouts or apertures provide the technical feature of flexibility to the bus bar and thereby provide relief from one or more of the stressors described herein which impact bus bars.

As shown in FIGS. 11-12, another cutout or aperture 158 may be provided between the dual wall 140 and the center projection 148, for example, in an elbow or joint 176 connecting the sidewall 132, 140 and the center projection 148. The aperture 158 or cutout length may be approximately half of the length of the projection 148 or a quarter of the length of the bus bar 120 in one or more examples of embodiments. However, alternative proportions (for example, but not limited to, 25%, 30%, 33%, 60%, 75% of the center projection width) should be contemplated as within the scope of this disclosure. The height of the cutout or aperture 158 may be the height of a joint or elbow 176 between the sidewall 132, 140 and center projection 148. However, alternative heights may be contemplated as within the scope of this disclosure. The cutout or aperture provides the technical feature of flexibility to the bus bar and thereby provides relief from one or more of the stressors described herein which impact bus bars.

While specific examples of dimensions, numbers of apertures, and locations are provided, one of skill in the art will appreciate that greater or lesser proportions of cutouts or apertures or recesses of the bus bar, as well as the number of cutouts, apertures, or recesses (for example, but not limited to, 2, 3, 4, 5, 6, 7, 8, etc.) may be used to accomplish the intended purposes. Likewise, while one cutout in each location may be shown, multiple cutouts (for example, but not limited to, 2, 3, 4, etc.) may be contemplated as within the scope of this disclosure. Variations in length (for example but not limited to, 25%, 30%, 33%, 50%, etc. as a percentage of bus bar length) and thickness or height should be contemplated as within the scope of this disclosure.

Figure 14:
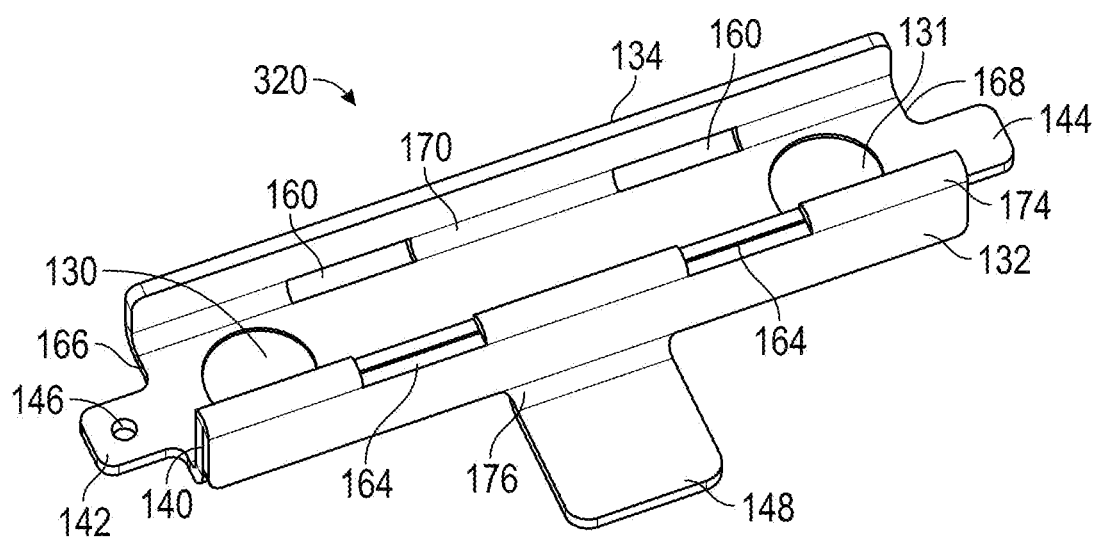
FIG. 14 is a perspective view of a first side of a bus bar having stress-relief features according to one or more alternative examples of embodiments.
Figure 15:
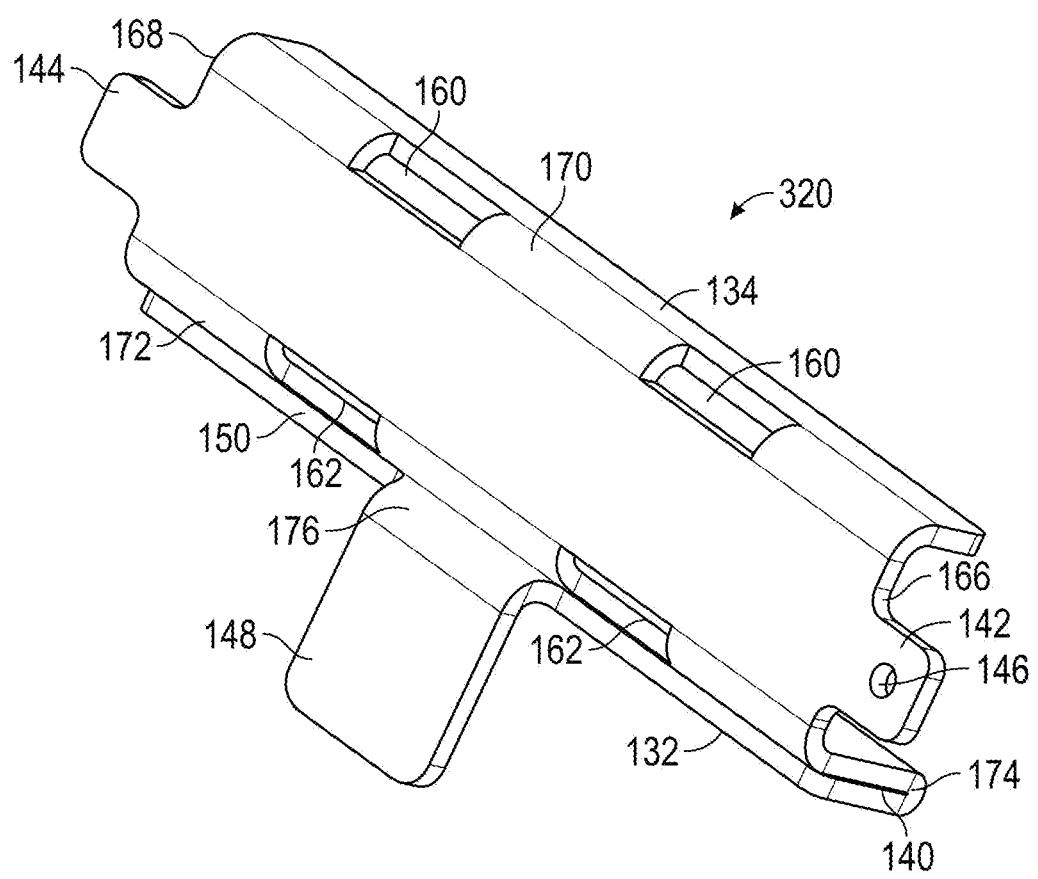
FIG. 15 is a perspective view of a second side of the bus bar shown in FIG. 14, according to one or more alternative examples of embodiments.

FIGS. 14-15 illustrate one or more alternative examples of embodiments of a bus bar 320 having stress relief features. In the illustrated example, the bus bar 320 is a stack-connecting bus bar, although such features may also be applied to a cell-connecting bus bar and/or a housing-connecting bus bar to achieve similar advantages. FIG. 14 may be understood to be a bottom view illustrating the terminal receivers 130, while FIG. 15 may be understood to be a top view. In the alternative examples shown in FIGS. 14-15, the stack-connecting bus bar 320 has two spaced apart cutouts or apertures 160 in a joint or elbow 170 between the second sidewall 134 and the base 136. As a non-limiting example, each of the cutouts or apertures 160 may have a length of approximately ⅙ or 17% of the length of the bus bar 320. While specific examples are provided, variation thereon (such as, but not limited to, 10%, 20%, 25%, 30%, etc.) should be contemplated as within the scope of this disclosure. The height of the cutout or aperture 160 may comprise approximately the width of the joint or elbow 170 between the second sidewall 134 and the base 136 (variations thereon may again be contemplated as within the scope of this disclosure, for example, 75%, 80%, etc. of the width of the joint or elbow). Similarly, as shown in FIG. 15, two cutouts or apertures 162 may be provided in a joint or elbow 172 between the base 136 and first sidewall 132. These cutouts 162 may be similar or different to the first group of cutouts in size and proportion to the bus bar 320. Moreover, as shown in FIG. 14, two additional cutouts or apertures or recesses 164 may be provided on the dual wall sidewall 140. The two cutouts or recesses 164 may comprise the width of the dual wall sidewall 140 thickness, in various embodiments, although variations thereon may be acceptable.

To this end, the alternative example of a stack-connecting bus bar 320 shown in FIGS. 14-15 has a plurality of cutout groupings, or first, second, and third groups of apertures 152 that form the stress relief features; the first grouping being provided on the first joint or elbow 170, the second grouping being provided on the second joint or elbow 172, and the third grouping being provided on the fold 174 of the dual wall 140. While two cutouts may be provided in each cutout grouping, variations thereon may be acceptable. Likewise, while certain relative widths, lengths, or heights may be provided for the cutouts, variations thereon should be contemplated as within the scope of this disclosure. For example, cutout height of 75%, 80%, etc. of the width of the joint or elbow as well as cutout length of 10%, 20%, 25%, 30%, etc. of bus bar length should be contemplated as within the scope of this disclosure. These cutouts or apertures or groupings provide the technical feature of flexibility to the bus bar and thereby provide relief from one or more of the stressors described herein which impact bus bars.

As indicated, while the Figures and description herein reference a "stack-connecting" bus bar, it should be understood the stress-relief features can be used in a variety of contexts. Therefore, while referred to as a "stack-connecting" bus bar, the Figures and description should be understood to relate to a disclosure for example, but not limited to, of a bus bar generally. For example, the disclosed stress-relief features could be applied to the cell-connecting bus bars and/or the housing connecting bus bars.

Accordingly, a bus bar 120, 320 for a battery module 20 is disclosed. The bus bar 120, 320 has a first sidewall 132, a second sidewall 134 and a base 136 joined to form a channel 138. In this regard, the first sidewall 132, the second sidewall 134, and the base 136 may form a U-shaped body. A plurality of terminal receivers 130, 131 are provided on the base 136 and configured to couple to a plurality of battery terminals 114. One or more stress-relief features are provided on the channel 138. The one or more stress-relief features of the bus bar may each comprise an aperture or cutout 152-164. In one or more examples of embodiments, the one or more stress-relief features comprise a plurality of stress-relief features. In some examples of embodiments, the one or more stress-relief features are provided on a joint 172 between the first sidewall 132 and the base 136 and a joint 170 between the second sidewall 134 and the base 136. In some examples of embodiments, the first sidewall 132 comprises a dual wall 140. The dual wall 140 may have a center projection 148 extending, perpendicular to the channel 138, and in some examples of embodiments, one or more stress-relief features may be provided in the joint 176 between the dual wall 140 and the center projection 148.

In one or more examples of embodiments, the bus bar is a stack-connecting bus bar 120 and the plurality of terminal receivers comprise a first terminal receiver 130 configured to couple to a first battery terminal 114 from the plurality of battery terminals and a second terminal receiver 131 configured to couple to a second battery terminal 114 from the plurality of battery terminals, wherein the first battery terminal is on a first battery cell 110*a*, and the second battery terminal is on a second battery cell 110*b*. The first battery cell 110a may further be in a first battery cell stack 124a, and the second battery cell 110b may be in a second battery cell stack 124b.

A battery module 20 is also disclosed. The battery module 20 comprises a battery housing 100 having a battery cell compartment 116 which receives one or more battery cells 110 in battery cell stacks 124. A plurality of battery cells 110 are joined together and form a plurality of battery cell stacks 124, which may be arranged in an adjacent configuration. A bus bar carrier 122 is positioned over the plurality of battery cells 110 and plurality of battery cell stacks 124. The bus bar carrier 122 has one or more bus bars 120 or 320 thereon electrically coupling the plurality of battery cells 1110, wherein the one or more bus bars comprise one or more bus bars having stress relief features. The stress-relief features may be an aperture or cutout or recess 152-164. In some examples of embodiments, a plurality of stress-relief features may be provided on the bus bar. In some examples of embodiments, the one or more bus bars 120 or 320 comprise a bus bar having a first sidewall 132, a second sidewall 134 and a base 136 joined to form a channel 138. In this regard, the first sidewall 132, the second sidewall 134, and the base 136 may form a U-shaped body. A plurality of terminal receivers 130, 131 are provided on the base 136 configured to couple to a plurality of battery terminals 114. In one or more examples of embodiments, the stress-relief features are provided on the channel 138. The stress-relief features may be provided on a joint 172 between the first sidewall 132 and the base 136 and a joint 170 between the second sidewall 134 and the base 136. A cover 104 is provided on the battery module 20 and secured to the housing 100, enclosing the bus bar carrier 122, bus bars 120, 320, 126, 128, and plurality of battery cells 110.

In some examples of embodiments, the first sidewall 132 comprises a dual wall 140. The dual wall 140 may have a center projection 148 extending perpendicular to the channel, and one or more stress-relief features may be provided in a joint 176 between the dual wall 140 and the center projection 148.

The bus bar 120, 320 may be a stack-connecting bus bar 120 coupling a battery cell 110a from a first stack 124a from the plurality of battery cell stacks 124 to a second battery cell 110b from a second stack 124b from the plurality of battery cell stacks 124.

The apertures or cut-outs in a bus bar described herein comprise stress-relief features that provide various advantages. When used in a stack-connecting battery cell application, the bus bars having stress-relief features may aid in managing stressors caused by distance between cells and higher load. The stress-relief features may also aid in maintaining a bus bar cross-section which can handle loads, while helping maintain bus bar integrity. The stress-relief features may also help maintain structural integrity, as well as the weld interface between the terminal and bus bar. For instance, the example stack-connecting bus bar may aid in preventing damage to the weld joint at the terminal to bus bar or terminal at the joint, as the stress-relief features allow the bus bar to flex as the battery module moves. This may also assist in preventing deformation of the battery cell. In one or more examples of embodiments, the stress-relief features provided on the bus bar may also reduce problems with heating caused by the length of the bus bar, by providing discontinuities and flexibility in the bus bar. Further, a bus bar having stress relief features may also have advantages for manufacturability and cost-effectiveness, as less material is required to manufacture the bus bar. Additional advantages will be apparent from the foregoing disclosure and Figures.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A bus bar for a battery module comprising:
a first sidewall, a second sidewall and a base joined to form a channel, the first sidewall comprises a dual wall having a center projection extending perpendicular to the channel;
a plurality of terminal receivers on the base configured to couple to a plurality of battery terminals; and
one or more stress-relief features provided on the channel, the one or more stress-relief features comprise an aperture or cutout, and the one or more stress-relief features are provided on a bend of the channel and in a joint between the dual wall and the center projection.

2. The bus bar of claim 1, wherein the one or more stress-relief features are provided on a joint between the first sidewall and the base or a joint between the second sidewall and the base.

3. The bus bar of claim 1, wherein the one or more stress-relief features comprise a plurality of stress-relief features.

4. The bus bar of claim 1, wherein the first sidewall, the second sidewall, and the base form a U-shaped body.

5. The bus bar of claim 1, wherein the bus bar is a stack-connecting bus bar and the plurality of terminal receivers comprise a first terminal receiver configured to couple to a first battery terminal from the plurality of battery terminals and a second terminal receiver configured to couple to a second battery terminal from the plurality of battery terminals, wherein the first battery terminal is on a first battery cell, and the second battery terminal is on a second battery cell.

6. The bus bar of claim 5, wherein the first battery cell is in a first battery cell stack, and the second battery cell is in a second battery cell stack.

7. A battery module comprising the bus bar of claim 1.

8. A battery module comprising:
a battery housing having a battery cell compartment which receives one or more battery cells in battery cell stacks;
a plurality of battery cells joined together to form a plurality of battery cell stacks;
a bus bar carrier positioned over the plurality of battery cells and plurality of battery cell stacks, the bus bar carrier having one or more bus bars thereon electrically coupling the plurality of battery cells, the one or more bus bars comprise a bus bar having a first sidewall, a second sidewall, and a base joined to form a channel, and a plurality of terminal receivers on the base configured to couple to a plurality of terminals, wherein the first sidewall comprises a dual wall having a center projection extending perpendicular to the channel, wherein the one or more bus bars comprise one or more bus bars having stress-relief features, wherein the stress-relief features comprise an aperture or cutout, and wherein the stress-relief features are provided on a bend of the channel and in a joint between the dual wall and the center projection; and
a cover enclosing the bus bar carried and plurality of battery cells and secured to the housing.

9. The battery module of claim 8, wherein the stress-relief features are provided on a joint between the first sidewall and the base or a joint between the second sidewall and the base.

10. The battery module of claim 8, wherein the first sidewall, the second sidewall, and the base form a U-shaped body.

11. The battery module of claim 8, wherein the one or more bus bars have a plurality of stress-relief features.

12. The battery module of claim 8, wherein the one or more bus bars is a stack-connecting bus bar coupling a battery cell from a first stack from the plurality of battery cell stacks to a second battery cell from a second stack from the plurality of battery cell stacks.

13. A bus bar for a battery module comprising:
a base extending along a first plane;
a plurality of terminal receivers on the base configured to couple to a plurality of battery terminals;
a sidewall joined to the base, the sidewall including a dual wall, one or more stress-relief features provided along a bend between the sidewall and the dual wall, and the sidewall and dual wall extending along a second plane orthogonal to the first plane; and
a center projection extending perpendicularly from the dual wall.

14. The bus bar of claim 13, wherein the base and the sidewall extend along a first direction and the center projection extends along a second direction perpendicular to the first direction.

15. The bus bar of claim 13, wherein a first side of the dual wall is joined to the sidewall and the center projection extends from a second side of the dual wall.

* * * * *